United States Patent
Tokizawa

(10) Patent No.: US 10,181,776 B2
(45) Date of Patent: Jan. 15, 2019

(54) STATOR WINDING AND METHOD OF MANUFACTURING THE SAME

(71) Applicant: DENSO CORPORATION, Kariya, Aichi-pref. (JP)

(72) Inventor: Takashi Tokizawa, Nagoya (JP)

(73) Assignee: DENSO CORPORATION, Kariya (JP)

( * ) Notice: Subject to any disclaimer, the term of this patent is extended or adjusted under 35 U.S.C. 154(b) by 133 days.

(21) Appl. No.: 15/459,432

(22) Filed: Mar. 15, 2017

(65) Prior Publication Data
US 2017/0187270 A1    Jun. 29, 2017

Related U.S. Application Data

(62) Division of application No. 14/081,419, filed on Nov. 15, 2013, now abandoned.

(30) Foreign Application Priority Data

Nov. 15, 2012 (JP) .................................. 2012-250769

(51) Int. Cl.
*H02K 15/00* (2006.01)
*H02K 15/02* (2006.01)
(Continued)

(52) U.S. Cl.
CPC ............. *H02K 15/026* (2013.01); *H02K 3/12* (2013.01); *H02K 15/0421* (2013.01); *H02K 15/085* (2013.01); *Y10T 29/49009* (2015.01)

(58) Field of Classification Search
CPC ......... Y10T 29/49009; Y10T 29/49012; Y10T 29/49181; Y10T 29/49194; H01F 41/06; H02K 15/085; H02K 3/12
(Continued)

(56) References Cited

U.S. PATENT DOCUMENTS 9,512,506 B2 * 12/2016 Oishi ..................... C22C 9/02
2001/0007169 A1    7/2001 Takahashi et al.
(Continued)

FOREIGN PATENT DOCUMENTS

JP    H10-99902 A    4/1998
JP    2001-197709 A    7/2001
(Continued)

OTHER PUBLICATIONS

Sep. 16, 2014 Japanese Office Action issued in Japanese Application No. 2012-250769.
(Continued)

*Primary Examiner* — Thiem Phan
(74) *Attorney, Agent, or Firm* — Oliff PLC

(57) ABSTRACT

There is provided a winding to be wound at a stator of a rotary electric machine. The winding is produced from a flat wire having a rectangular cross section along a plane perpendicular to a length-wise direction. The flat wire is coated with an electric insulating layer and is bent to have curves at given portions of the flat wire in the length-wise direction. The curves are located on an axial outer side of the stator. The cross section of the flat wire has four corners, among which mutually-adjacent two corners are lager in curvatures than remaining mutually-adjacent two corners. The mutually-adjacent two corners whose curvatures are smaller are positioned on a circumferential outer side of each of the curves and the mutually-adjacent two corners whose curvatures are larger are positioned on a circumferential inner side of each of the curves.

2 Claims, 5 Drawing Sheets

(51) Int. Cl.
*H02K 3/12* (2006.01)
*H02K 15/04* (2006.01)
*H02K 15/085* (2006.01)

(58) Field of Classification Search
USPC .......................... 29/596, 598, 825, 861, 868
See application file for complete search history.

(56) References Cited

U.S. PATENT DOCUMENTS

| | | |
|---|---|---|
| 2003/0005579 A1 | 1/2003 | Takahashi et al. |
| 2003/0015932 A1 | 1/2003 | Oohashi et al. |
| 2003/0163912 A1 | 9/2003 | Tokizawa et al. |
| 2003/0164656 A1 | 9/2003 | Sakurai |
| 2003/0173860 A1 | 9/2003 | Even |
| 2004/0256943 A1 | 12/2004 | Omura |
| 2005/0015978 A1* | 1/2005 | Andersen ............... D07B 7/025 29/868 |
| 2009/0158800 A1 | 6/2009 | Takada |
| 2009/0249613 A1 | 10/2009 | Takada et al. |
| 2009/0284338 A1 | 11/2009 | Maruyama et al. |
| 2010/0251796 A1 | 10/2010 | Akimoto et al. |
| 2010/0295647 A1 | 11/2010 | Maruyama et al. |

FOREIGN PATENT DOCUMENTS

| | | |
|---|---|---|
| JP | 2003-032933 A | 1/2003 |
| JP | 2003-259584 A | 9/2003 |
| JP | 2003-331672 A | 11/2003 |
| JP | 2004-519993 A | 7/2004 |
| JP | 2005-012887 A | 1/2005 |
| JP | 2009-277914 A | 11/2009 |
| JP | 4506895 B2 | 7/2010 |
| JP | 2013-153113 A | 8/2013 |

OTHER PUBLICATIONS

Feb. 26, 2016 Office Action Issued in U.S. Appl. No, 14/081,419.
Oct. 7, 2016 Office Action issued in U.S. Appl. No. 14/081,419.
English translation of JP 2003018779; Jan. 2003; Kurahashi et al.; Japan.

* cited by examiner

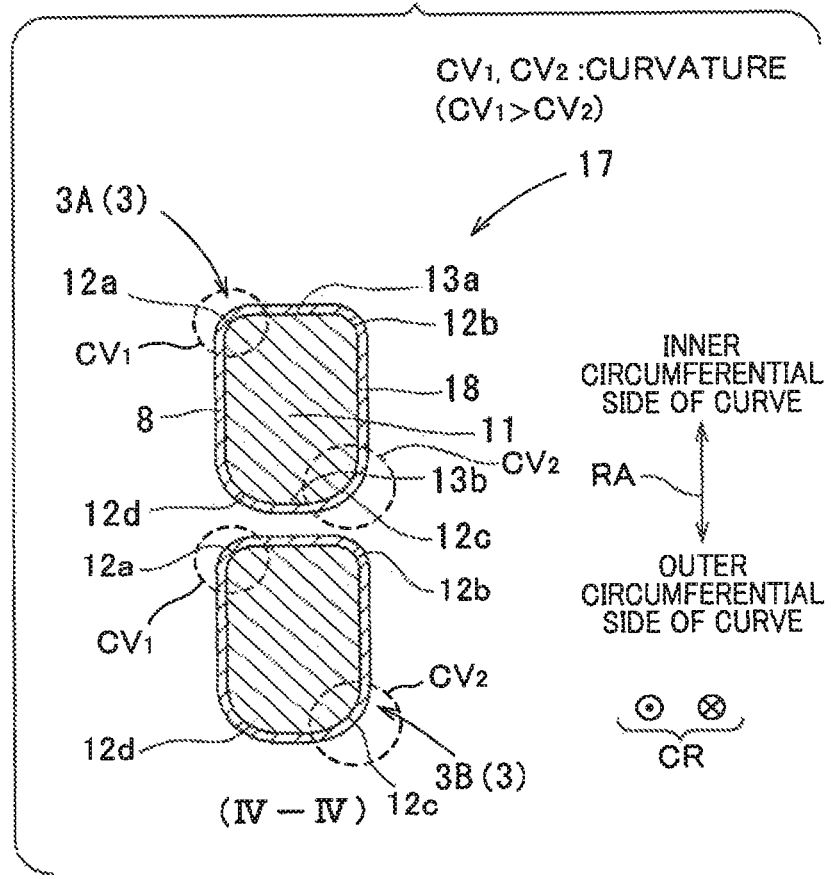

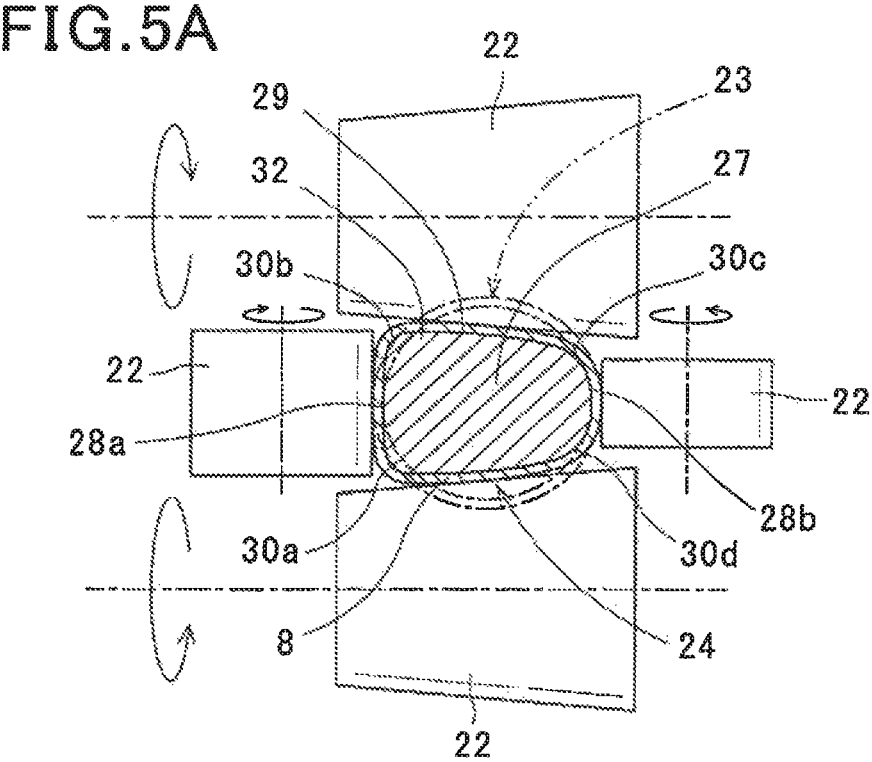
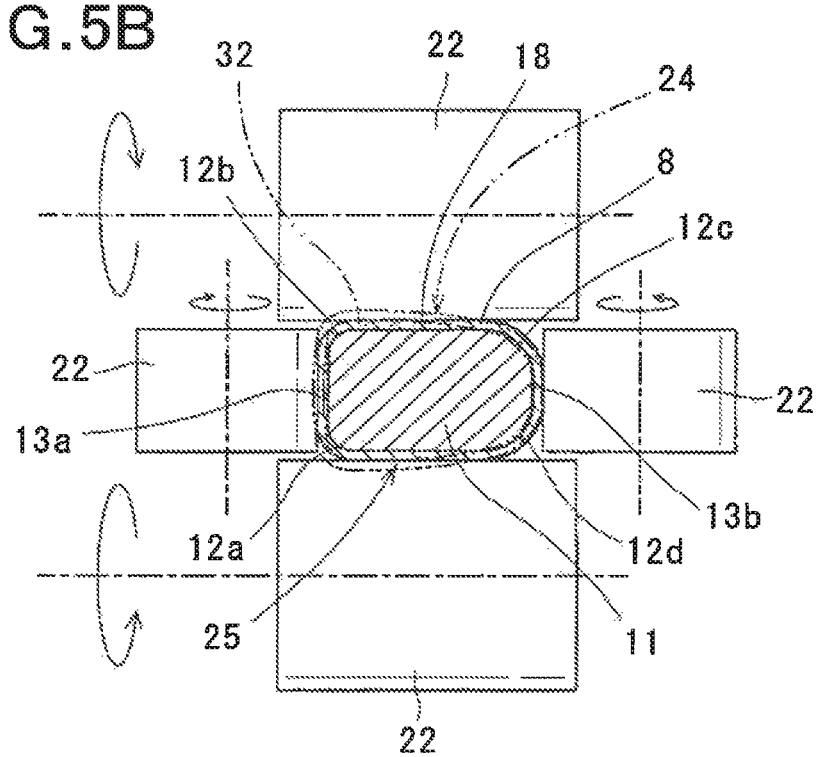

STATOR WINDING AND METHOD OF MANUFACTURING THE SAME

CROSS-REFERENCE TO RELATED APPLICATION

This application is a divisional of U.S. application Ser. No. 14/081,419 filed Nov. 15, 2013, which is based on and claims priority under 35 U.S.C. 119 from Japanese Patent Application No. 2012-250769 filed on Nov. 15, 2012, the entire contents of which are incorporated herein by reference.

BACKGROUND OF THE INVENTION

[Technical Field of the Invention]

The present invention mainly relates to a stator winding for use in a rotary electric machine, and, in particular, to such a stator winding which is preferably used in a vehicle alternator.

[Related Art]

A stator winding based on conventional art for use in a rotary electric machine is formed, for example, by bending linear conductors that are applied with insulation coating. In bending the linear conductors, the insulation coating is expanded in the outer surface of a curve which is formed by bending each of the conductors. As a result, the insulation coating is sometimes problematically damaged (e.g., refer to patent document JP-B-4506895).

In order to meet the recent needs of enhancing the performance of a rotary electric machine, a stator is required to increase the space factor in the slots. For this purpose, there is an increasing need of using a flat wire, as a material for forming a stator winding, which has a rectangular cross section. However, compared to a round wire having a circular cross section, a flat wire, when bent, causes a significant expansion in the insulation coating in the outer surface of the curve mentioned above, and accordingly has a high probability of suffering from damages in the insulation coating. Therefore, additional measures may have to be taken against this, such as increasing the thickness of the insulation coating of the flat wire, or reinforcing the insulation coating of the flat wire after being bent, or the like.

Further, from a standpoint of reducing cost incurred in the materials, only round wires may be purchased and rolled into flat wires only when used for a stator winding that is required to achieve a high space factor.

In this case, the coating characteristics will be impaired in the process of rolling the round wire into a flat wire. Therefore, the probability of damaging the insulation coating will become higher.

SUMMARY

Hence, in consideration of the foregoing, it is desired to reduce the probability of damaging the insulation coating in the outer surfaces of curves of a flat wire that forms a stator winding.

As one exemplary embodiment, there is provided a winding to be wound at a stator of a rotary electric machine. The winding is produced from a flat wire having a rectangular cross section along a plane perpendicular to a length-wise direction, being coated with an electric insulating layer, and being bent to have curves (or curved sections) at given portions of the flat wire in the length-wise direction, the curves being located on an axial outer side of the stator, wherein the cross section of the flat wire has four corners, among which mutually-adjacent two corners are lager in curvatures than remaining mutually-adjacent two corners, and the mutually-adjacent two corners whose curvatures are smaller than the others are positioned on a circumferential outer side of each of the curves and the mutually-adjacent two corners whose curvatures are larger than the others are positioned on a circumferential inner side of each of the curves.

When a flat wire is bent, the amount of expansion of the flat wire varies depending on the portions, such as an inner portion or surfaces, of the flat wire. The amount of expansion becomes smaller as the curvature becomes smaller in the corners of the cross section of the flat wire. Therefore, the two smaller-curvature corners are ensured to reside in the outer surface of the curve mentioned above, in which the expansion is significant, to minimize the amount of expansion in the insulation coating in the outer surface. Thus, the probability of damaging the insulation coating is reduced in the outer surface of the curve of the stator winding that uses a flat wire as a material.

In the following description, a flat wire in which the curvature of two adjacent corners in the cross section is larger than that of the remaining two corners, may be referred to as a deformed flat wire. Also, throughout the specification, when the term "cross section" is used, it refers to a cross section perpendicular to the longitudinal direction.

As another embodiment, there is provided a method of manufacturing the winding according to the foregoing. The method includes preparing a round wire with electrically insulating coating, the round wire having a round section along a plane perpendicular to a length-wise direction thereof; and rolling the round wire at two stages a first rolling stage and a second rolling stage following the first rolling stage, at the first rolling stage of which the round wire is rolled into a deformed flat wire having an isosceles trapezoid cross section.

Thus, further rolling is performed using the flat wire as an intermediate material having an isosceles trapezoid cross section, so that a deformed flat wire can be easily formed. Specifically, plastic flow is easily caused, by rolling, in between the legs of the isosceles trapezoid cross section, i.e. near the surface of a portion in which the length between the legs is large. Accordingly, the metal is permitted to plastically flow into the two corners which are desired to have large curvature, thereby easily forming a deformed flat wire.

BRIEF DESCRIPTION OF THE DRAWINGS

In the accompanying drawings:

FIG. 4 is a cross-sectional view taken along a line IV-IV of FIG. 3, and

FIGS. 5A and 5B are explanatory views illustrating a first rolling stage and a second rolling stage, respectively.

DETAILED DESCRIPTION OF THE PREFERRED EMBODIMENTS

Figure 1:
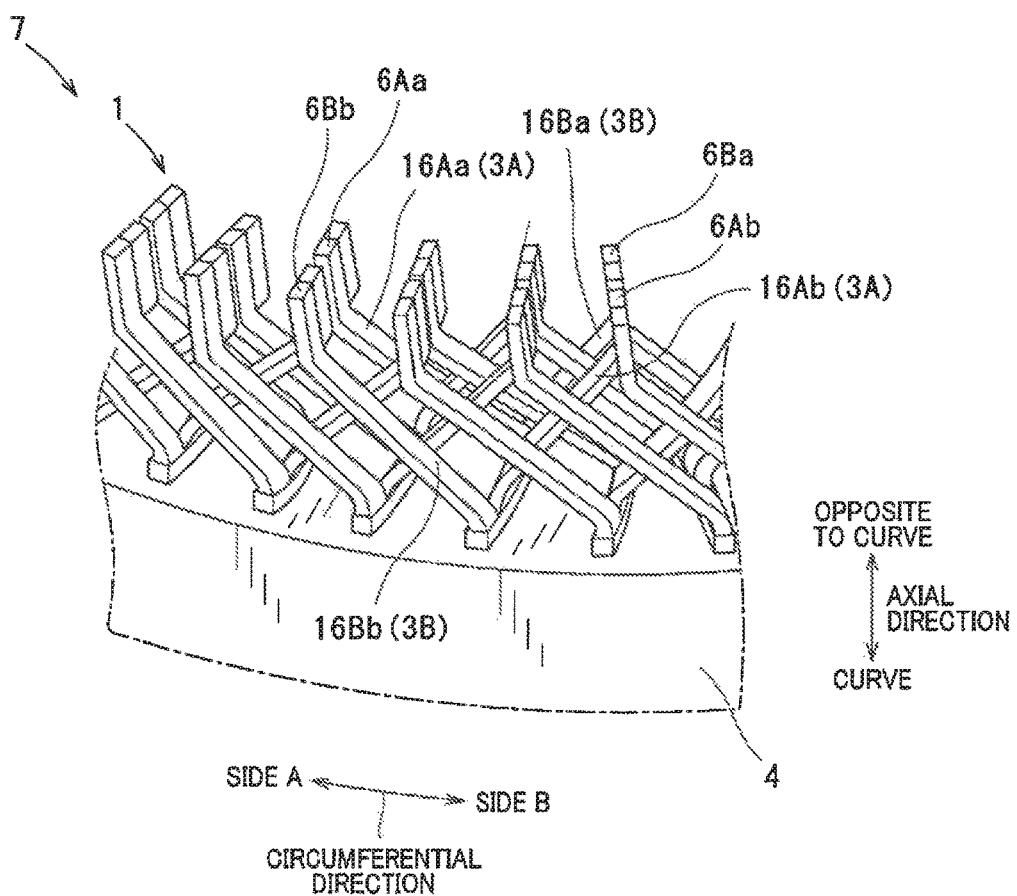
FIG. 1 is a partial perspective view illustrating a part of a stator, according to an embodiment of the present invention.

With reference to FIGS. 1-5A and 5B, hereinafter is described a preferred embodiment of the present invention.

With reference to the drawings, a configuration of a stator winding 1 of the embodiment is described.

The stator winding 1 is obtained by connecting a number of wire segments 3 (hereinafter also just referred to as segments 3), each having a curve (or a curved section) 2, in an electrically conductive manner. Specifically, the segments 3 before being connected are mounted to slots 5 of a stator core 4 and deformed. Then, predetermined connecting portions 6 of the respective segments 3 are connected to each other in an electrically conductive manner. In order to avoid complication, the connecting portions in the drawings are indicated by 6Aa, 6Ba, 6Ab and 6Bb, which will be described later, instead of being simply indicated by 6. An integral body of the stator winding 1 and the stator core 4 provided in this way forms a stator 7 of a rotary electric machine. For example, the stator 7 is used in a vehicle alternator.

Each segment 3 is formed of a flat wire having a rectangular cross section 11 and having a surface applied with an insulation coating 8. For example, a flat wire is substantially bent into a shape of a V to form the curve (or the curved section) 2 at the bottom of the V shape.

As shown in FIG. 4 and FIGS. 5A and 5B, the rectangular cross section 11 of the flat wire as a material of the segment 3 has four corners 12a, 12b, 12c and 12d. Of these corners, the two adjacent corners 12a and 12b have a larger curvature than the remaining two corners 12c and 12d. In short, the flat wire is a deformed flat wire. In cases where each of the four corners 12a, 12b, 12c and 12d is produced as part of a circle of a radius r, the curvature is defined as 1/r.

Figure 2:
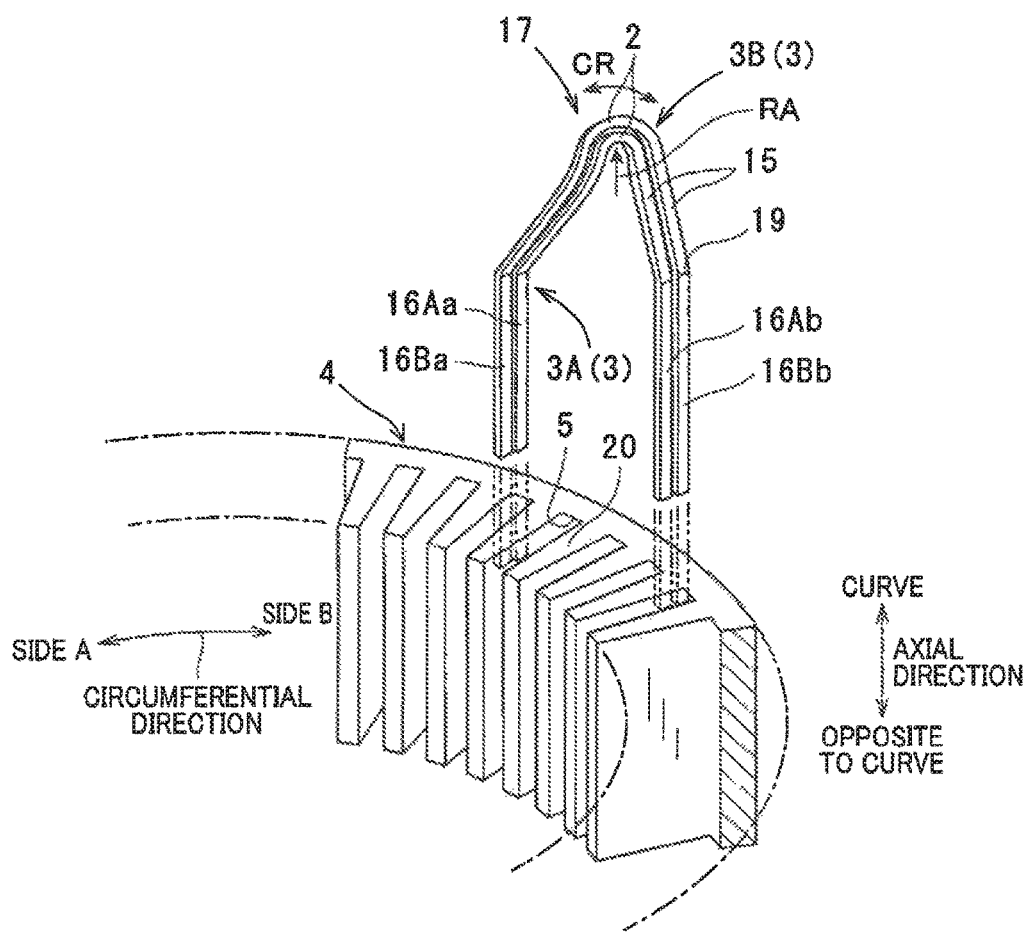
FIG. 2 is a partial perspective view illustrating insertion of a wire segment into a slot.
Figure 3:
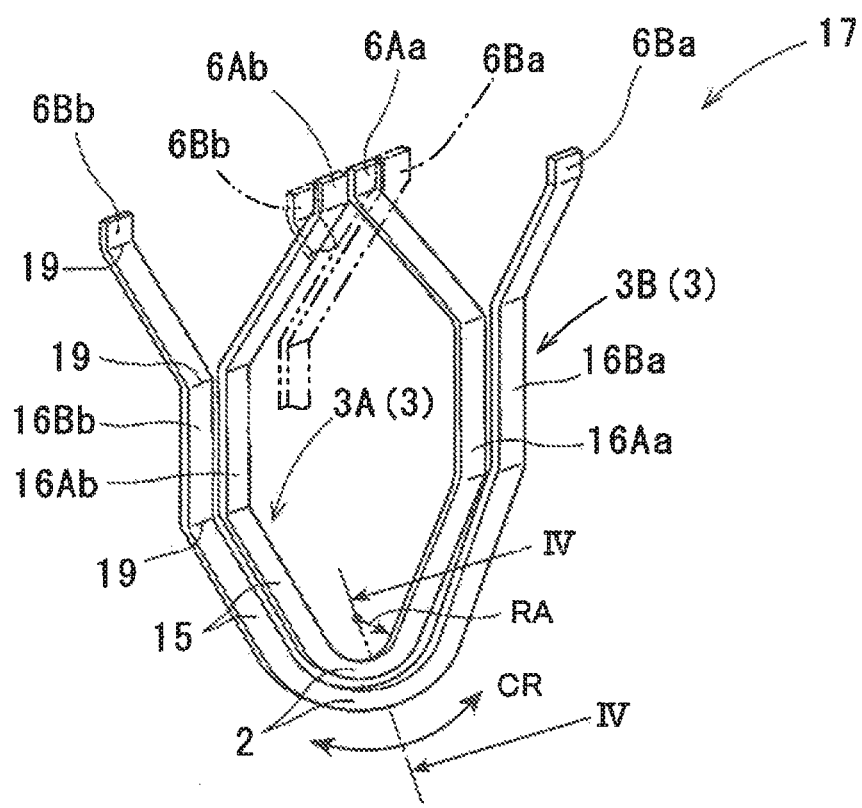
FIG. 3 is a perspective view illustrating a curved profile of the wire segment.

Specifically, for example, as shown in FIGS. 3 and 4, the rectangular cross section 11 of the deformed flat wire as a material of the segment 3 has two short sides 13a and 13b that are parallel to each other. Of these short sides 13a and 13b, one short side 13a has the two corners 12a and 12b whose curvature $CV_1$ is made larger than that $CV_2$ of the two corners 12c and 12d of the other short side 13b (refer to FIG. 4). As shown in FIGS. 2 and 3, each of the curves 2 is made to have a circumferential direction CR and a radial direction RA. For example, the short side 13a is ensured to reside in the inner surface of the curve 2 in the radial direction RA and the short side 13b is ensured to reside in the outer surface of the curve 2 in the radial direction RA.

Each segment 3 includes a V-shaped portion 15 and two linear portions 16 extending parallel to each other from the ends of the V-shaped portion 15 to display line symmetry (see FIGS. 2 and 3). The V-shaped portion 15 functions as an intermediate portion connecting the two linear portions. In order to avoid complication, the linear portions in the drawings are indicated by 16Aa, 16Ba, 16Ab and 16Bb, which will be described later, instead of being simply indicated by 16.

Two types of the segment 3 are used here, one type being a segment 3A having the curve 2 of a larger curvature, and the other type being a segment 3B having the curve 2 of a smaller curvature. The curve 2 of the segment 3A is arranged confronting the inner surface of the curve 2 of the segment 3B. The segments 3A and 3B, when inserted into the slots 5, form a single wire unit 17 (hereinafter also just referred to as unit 17). In the embodiment, the curve 2 is twisted so that both linear portions of each segment are allowed to be inserted at different layers (levels) of the respective slots 5, as shown in FIG. 2. Hence, the circumferential direction of each curve 2 is not parallel with that of the stator In one unit 17, the linear portions 16 on one side A of the curves 2 of the respective segments 3A and 3B are inserted into a slot 5 so as to be located radially inward of the slot, while the linear portions 16 on the other side B of the curves 2 are inserted into another slot 5 so as to be located radially outward of the slot (see FIG. 2). Hereinafter, of the two linear portions 16 of the segment 3A, the one located radially inward of the slot 5 is referred to as a linear portion 16Aa, and the one located radially outward of another slot 5 is referred to as a linear portion 16Ab. Also, of the two linear portions 16 of the segment 3B, the one located radially inward of the slot 5 is referred to as a linear portion 16Ba, and the one located radially outward of another slot 5 is referred to as a linear portion 16Bb.

The slot 5 into which the linear portions 16Aa and 16Ba are inserted is different from the slot 5 into which the linear portions 16Ab and 16Bb are inserted.

These two slots 5 are interposed by two different slots 5. Specifically, the unit 17 is outstretched on both sides of the curve 2 in the circumferential direction and inserted into the stator core 4, bridging three teeth 20. The linear portions 16Aa, 16Ba, 16Ab and 16Bb of the unit 17 have respective folds 19 which are parallel to long sides 18 of the rectangular cross section 11. The linear portions 16Aa, 16Ba, 16Ab and 16Bb are bent at the respective folds 19 (see FIG. 4 and FIGS. 5A and 5B).

The linear portions 16Aa, 16Ba, 16Ab and 16Bb have respective end portions which are projected from the slots 5 in the axial direction, i.e. projected in a direction opposite to the curve 2, to form the respective connecting portions 6. Here, the connecting portions 6 at the ends of the linear portions 16Aa, 16Ba, 16Ab and 16Bb are designated as connecting portions 6Aa, 6Ba, 6Ab and 6Bb, respectively. The connecting portion 6Aa is connected, in an electrically conductive manner, to the connecting portion 6Ba of a unit 17 which is inserted into a slot 5, being interposed by three teeth 20 on the one side A in the circumferential direction.

The connecting portion 6Ba is connected, in an electrically conductive manner, to the connecting portion 6Aa of a unit 17 which is inserted into a slot 5, being interposed by three teeth 20 on the other side B in the circumferential direction. The connecting portion 6Ab is connected, in an electrically conductive manner, to the connecting portion 6Bb of a unit 17 which is inserted into a slot 5, being interposed by three teeth 20 on the other side B in the circumferential direction. The connecting portion 6Bb is connected, in an electrically conductive manner, to the connecting portion 6Ab of a unit 17 which is inserted into a slot 5, being interposed by three teeth 20 on the one side A in the circumferential direction.

Thus, in the stator 7, the end portions of the linear portions 16Aa, 16Ba, 16Ab and 16Bb and the V-shaped portions 15 form coil ends axially projected from both axial sides of the stator core 4. Then, a rotor is arranged radially inside of the stator 7 to thereby form a rotary electric machine.

Referring to FIGS. 5A and 5B, hereinafter is described a method of fabricating the stator winding 1 of the embodiment, in particular, a method of forming the deformed flat wire that is a material of the wire segment 3.

The deformed flat wire is fabricated by rolling a round wire applied with insulation coating and having a circular cross section. In the rolling, the round wire is rolled in two stages (two-stage rolling) using various rollers 22. In the following description, the material supplied in a first rolling stage performed firstly may be referred to as an initial material 23. Also, the material resulting from the first rolling stage may be referred to as an intermediate material 24. Further, the material resulting from a second rolling stage may be referred to as a final material 25.

First, a round wire is prepared as the initial material 23, and then the intimal material 23 is subjected to the first rolling stage.

In the first rolling stage, a round wire as the initial material 23 is rolled into a flat wire as the intermediate material 24 whose cross section is in an isosceles trapezoid shape. Then, in the second rolling stage, the intermediate material 24 is rolled into a deformed flat wire as the final material 25. In a isosceles trapezoid cross section 27 of the intermediate material 24, two bases 28a and 28b substantially parallel to each other correspond to the short sides 13a and 13b, respectively, in the rectangular cross section 11 of the final material 25. Similarly, two legs 29 correspond to the long sides 18 in the rectangular cross section 11.

Further, of the two bases 28a and 28b, the longer base 28a has two corners 30a and 30b which correspond to the two corners 12a and 12b (i.e., two first corners), respectively, having a larger curvature in the rectangular cross section 11. The shorter base 28b has two corners 30c and 30d which correspond to the two corners 12c and 12d (i.e., two second corners), respectively, having a smaller curvature in the rectangular cross section 11.

In the second rolling stage, a portion 32 is chiefly subjected to rolling. The portion 32 is a portion near the base 28a, in which the length between the legs 29 is large. Also, in the second rolling stage, the deformation volume of the intermediate material 24 is larger in the portion 32 near the base 28a between the legs 29, than in a portion near the base 28b. Therefore, camber is likely to be caused in the final material 25 in which the short sides 13a and 13b reside in the outer and inner surfaces, respectively. For this reason, in the second rolling stage, the rollers 22 are arranged to minimize the occurrence of camber.

The stator winding 1 of the embodiment uses a deformed flat wire as the final material 25. The deformed flat wire is bent to form the curve 2. In bending the deformed flat wire, the two smaller-curvature corners 12c and 12d are ensured to reside in the outer surface of the curve 2, and the two larger-curvature corners 12a and 12b are ensured to reside in the inner surface of the curve 2.

Thus, the two smaller-curvature corners 12c and 12d are permitted to reside in the outer surface of the curve 2, in which the insulation coating 8 is significantly expanded by the bending. With this configuration, expansion of the insulation coating 8 is minimized in the outer surface of the curve 2. As a result, the probability of damaging the insulation coating 8 is reduced in the outer surface of the curve 2 of the stator winding 1 that uses a flat wire as a material.

The deformed flat wire as the final material 25 is fabricated by rolling a round wire as the initial material 23 in two stages, the round wire having a circular cross section and applied with insulation coating. In the preceding first rolling stage, the round wire is rolled into the intermediate material 24 whose cross section is in an isosceles trapezoid shape.

Thus, the intermediate material 24 having a cross section in an isosceles trapezoid shape is subjected to rolling to thereby easily form a deformed flat wire as the final material 25. Specifically, plastic flow is easily caused, by rolling, in between the legs 29 of the isosceles trapezoid cross section, i.e. near the surface of the portion 32 in which the length between the legs 29 is large. Accordingly, the metal is permitted to plastically flow into the two corners 30a and 30b which are desired to have large curvature, thereby easily forming a deformed flat wire.

The two-stage rolling is performed with the sequential transition of the material from the initial material 23 to the intermediate material 24 and further to the final material 25.

In this two-stage rolling, the final material 25 can be formed without having to do so much rolling in the intermediate material 24 with respect to the two corners 30c and 30d which are desired to have smaller curvature. Thus, compared to the case where the initial material 23 is rolled into the final material 25 without forming the intermediate material 24, the probability of damaging the insulation coating is further reduced in the corners 30c and 30d.

[Modifications]

The mode of the stator winding 1 and a method of fabricating the same is not limited to the embodiment described above, but may be variously modified.

For example, according to the fabrication method of the embodiment, the stator winding 1 is rolled in two stages. Alternative to this two-stage rolling, a single-stage rolling may be performed in which the deformed flat wire as the final material 25 is fabricated from the round wire as the initial material 23, without forming the intermediate material 24. In this case, the number of the stages is reduced and the cost incurred in the fabrication is reduced.

The present invention may be embodied in several other forms without departing from the spirit thereof. The embodiment and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A method of manufacturing a winding to be wound at a stator of a rotary electric machine, the winding comprising:
   linear portions inserted in slots of the stator; and
   two coil end portions respectively located on both axial sides of the stator,
   wherein two of the linear portions are connected with each other by a single intermediate portion and the two linear portions and the intermediate portion are formed as part of each of segments composing the winding, the intermediate portions of the segments being projected from one of the axial sides of the stator and formed as a coil end;
   the segment is formed by a flat wire having a rectangular cross section along a plane perpendicular to a lengthwise direction of the wire and being coated with an electric insulating layer, and the intermediate portion of each of the segments is bent to have a curve having a circumferential direction and a radial direction,
   the cross section of the flat wire has four corners consisting of two first corners located mutually adjacently on an inner circumferential side of the curve in the radial direction and two second corners located mutually adjacently on an outer circumferential side of the curve in the radial direction, and
   the two first corners have larger curvatures than the two second corners,
   the method comprising steps of:
   preparing a round wire with electrically insulating coating, the round wire having a round section along a plane perpendicular to a length-wise direction thereof; and
   rolling the round wire at two stages a first rolling stage and a second rolling stage following the first rolling stage, at the first rolling stage of which the round wire is rolled into a deformed flat wire having an isosceles trapezoid cross section.

2. The method according to claim 1, wherein, at the second rolling stage, the deformed flat wire is rolled into the flat wire to be wound at the stator.

* * * * *